United States Patent [19]

Zettler et al.

[11] 4,141,134
[45] Feb. 27, 1979

[54] TOOL CHANGER ATTACHMENT FOR MULTI-FUNCTION MACHINE TOOLS

[75] Inventors: William D. Zettler; Edward F. Woytych; Daniel J. Seichter; Frederick L. Schmidt, all of Fond du Lac, Wis.

[73] Assignee: Giddings & Lewis, Inc., Fond du Lac, Wis.

[21] Appl. No.: 721,096

[22] Filed: Sep. 7, 1976

[51] Int. Cl.$^2$ .......................................... B23Q 3/157
[52] U.S. Cl. .................................. 29/568; 214/1 BB
[58] Field of Search ............ 29/568; 214/1 BB, 1 BC, 214/1 BD; 408/35

[56] References Cited

U.S. PATENT DOCUMENTS

| | | | |
|---|---|---|---|
| 3,256,600 | 6/1966 | Swanson et al. | 29/568 |
| 3,551,984 | 1/1971 | Goebel et al. | 29/568 |
| 3,591,920 | 7/1971 | Brainard et al. | 29/568 |
| 3,595,109 | 7/1971 | Burroughs et al. | 408/35 X |
| 3,811,179 | 5/1974 | Anderson | 29/568 |

FOREIGN PATENT DOCUMENTS

| | | | |
|---|---|---|---|
| 2264080 | 7/1974 | Fed. Rep. of Germany | 29/568 |
| 458421 | 3/1975 | U.S.S.R. | 29/568 |

*Primary Examiner*—Gil Weidenfeld
*Attorney, Agent, or Firm*—Leydig, Voit, Osann, Mayer & Holt, Ltd.

[57] ABSTRACT

An automatic tool changer for horizontal spindle multi-function machining centers constructed as a self-contained unit adapted for installation as original equipment or as an accessory. The tool changer has a large capacity magazine and is supported on an independent base so as to avoid the transfer of substantial external loads to the machine elemenets. Tools are transferred between the magazine and spindle by means of a shuttle which carries a two handed transfer arm. Interference with the normal machining motions of the machine is also avoided.

10 Claims, 16 Drawing Figures

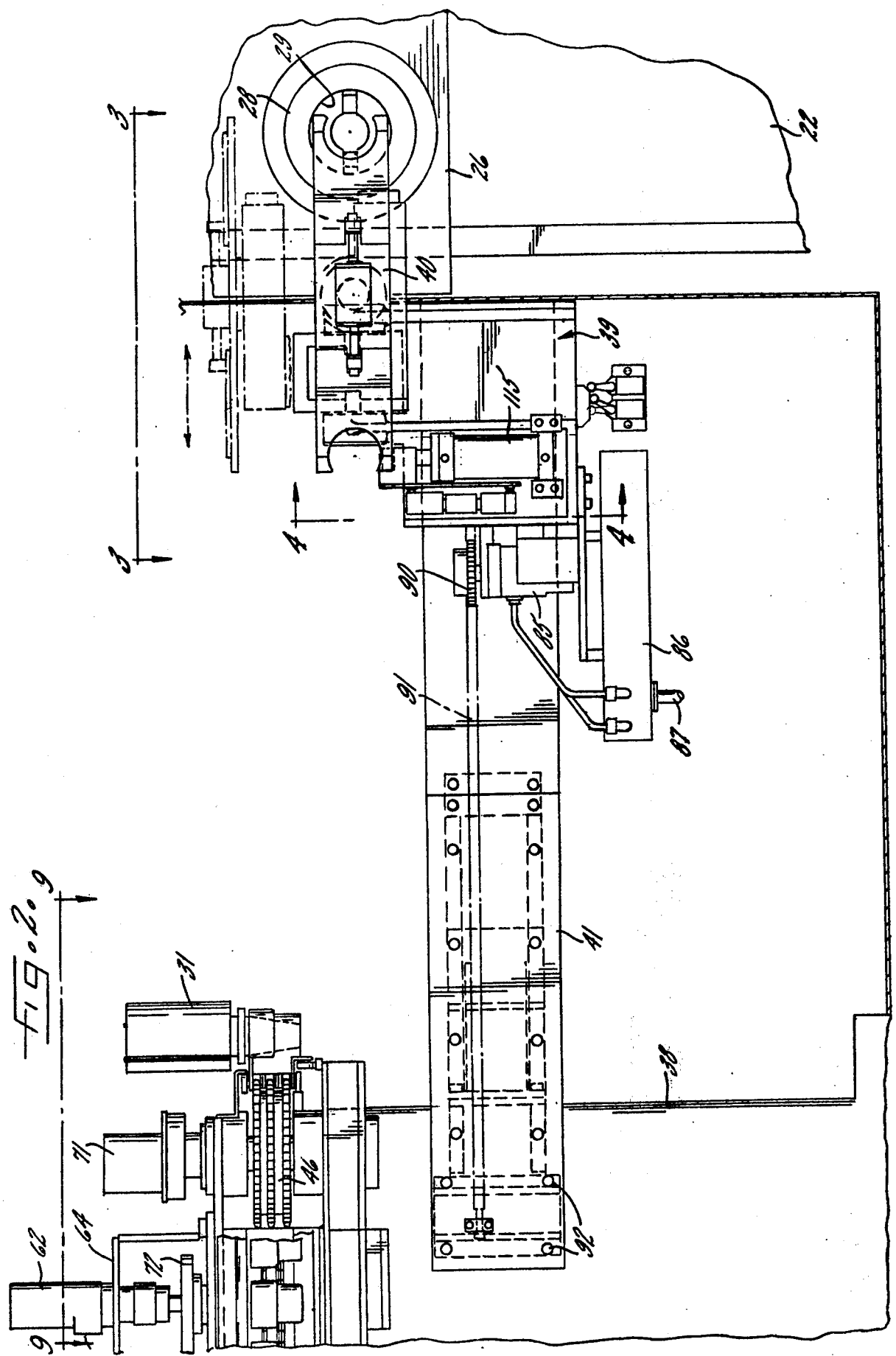

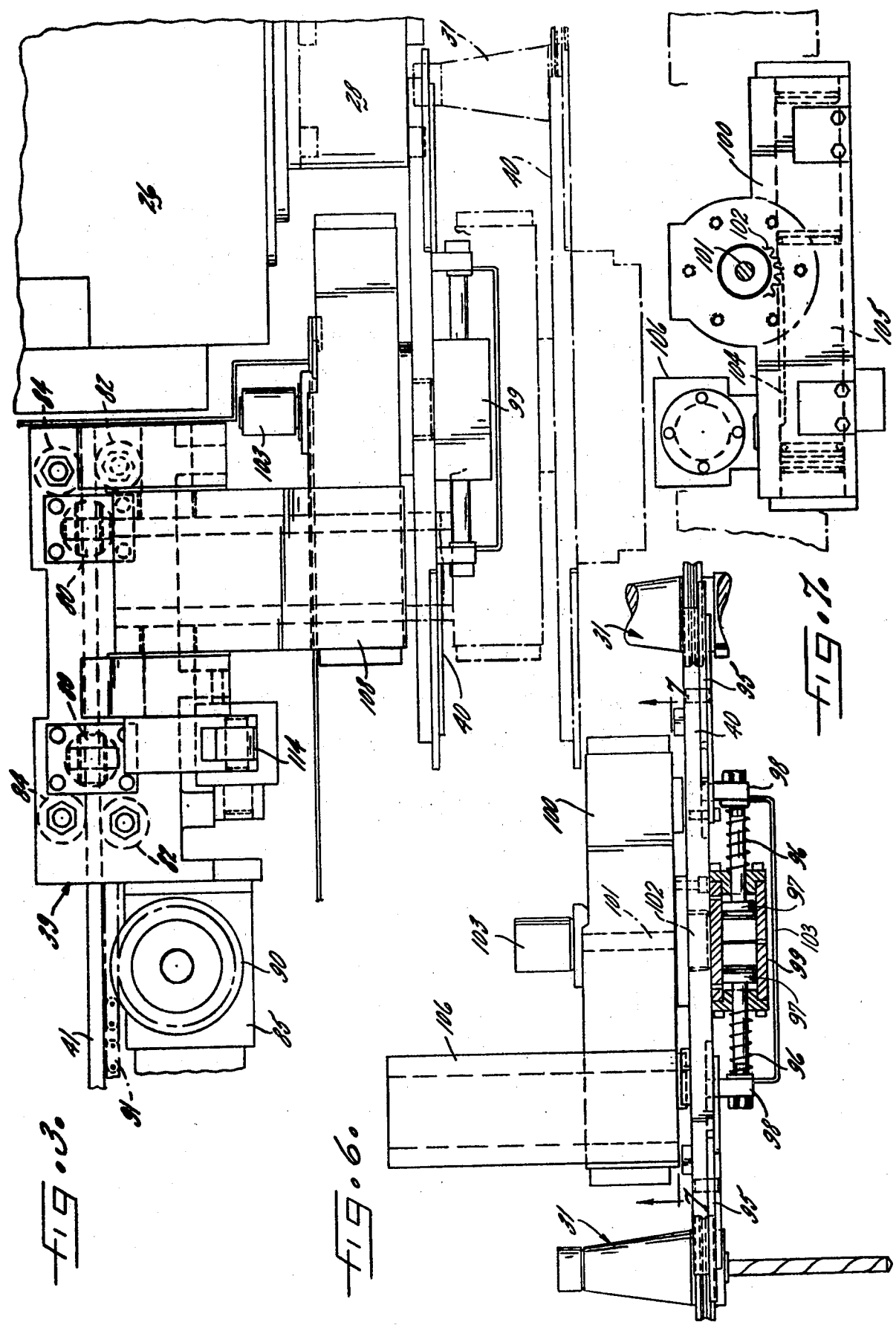

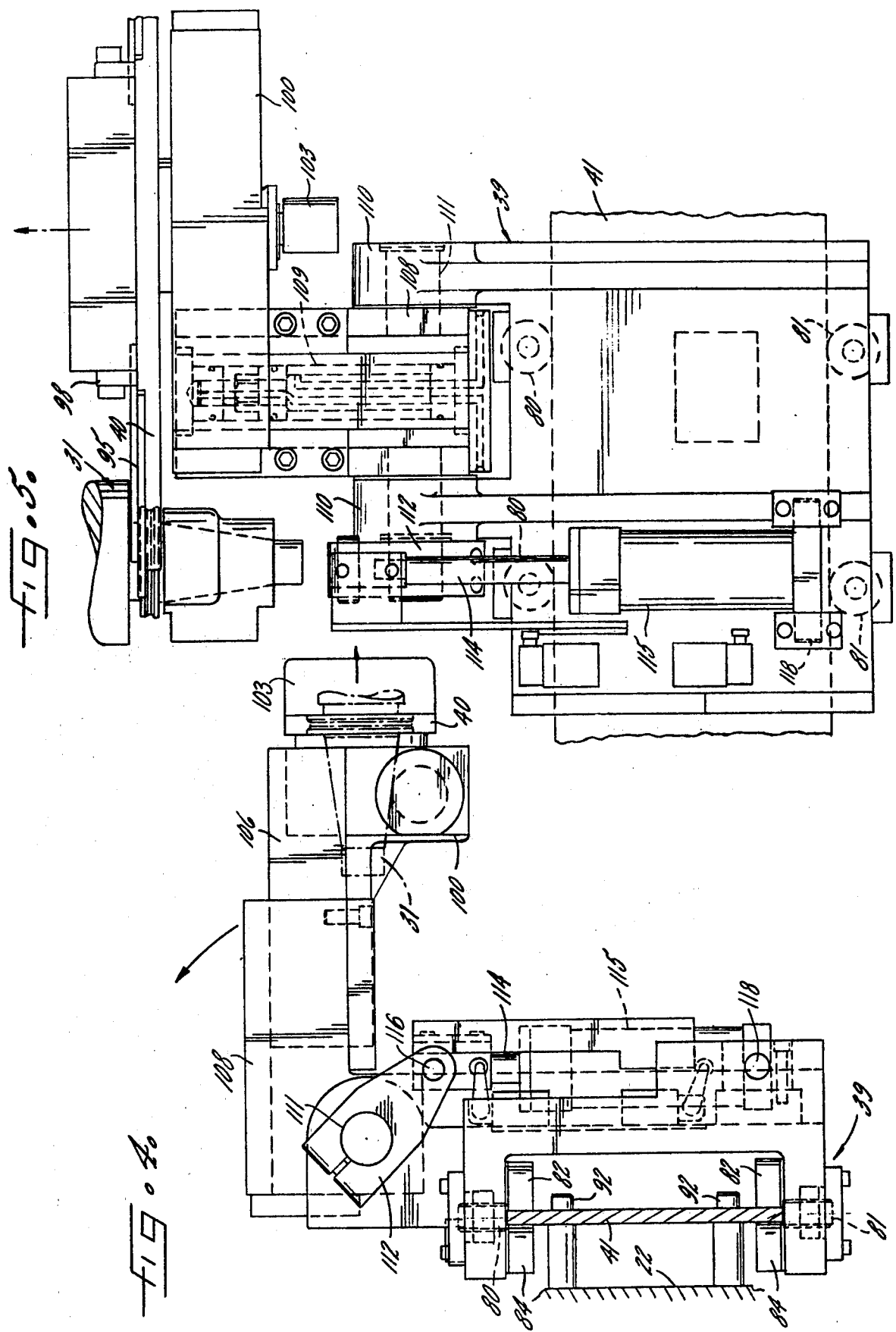

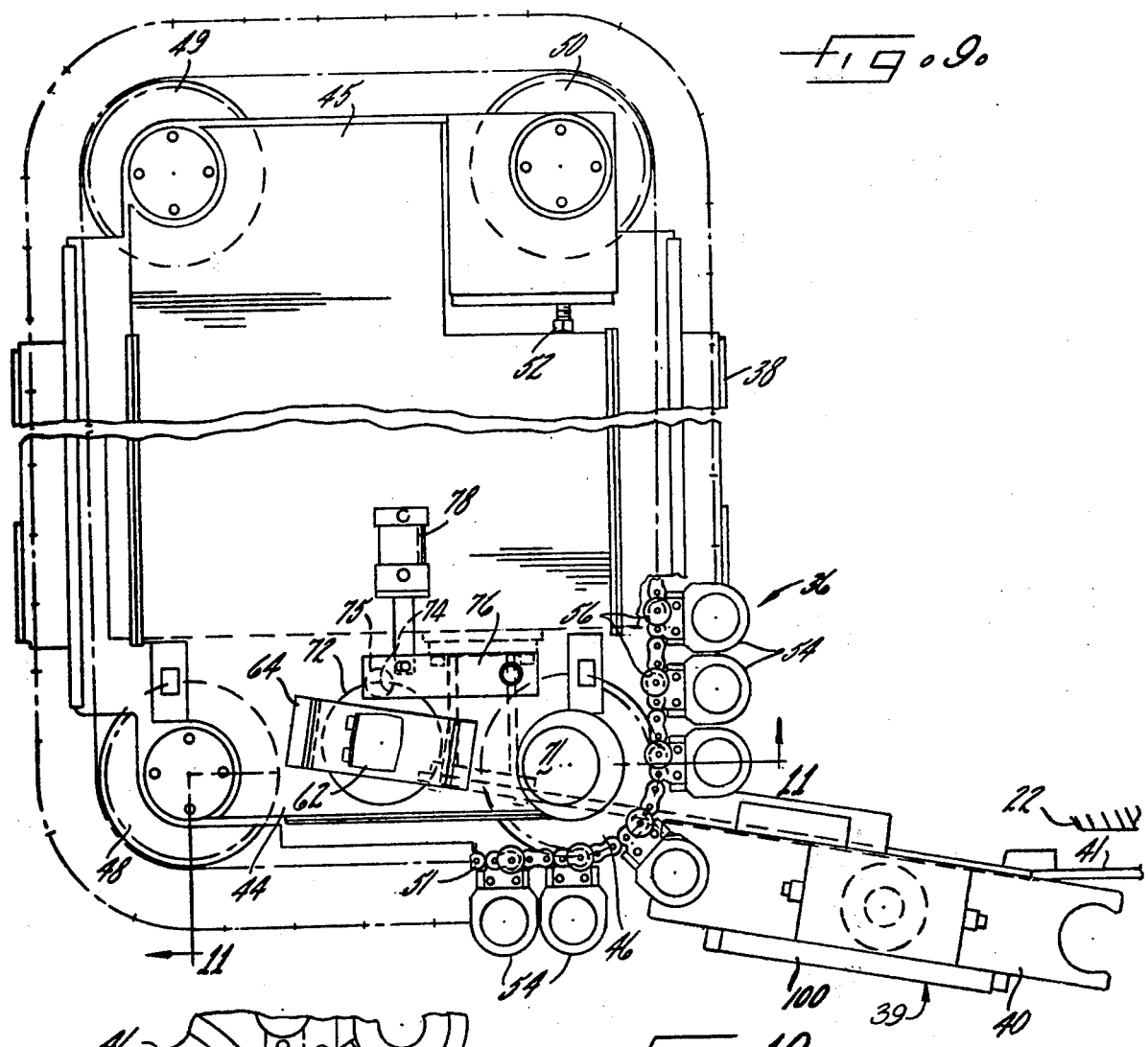
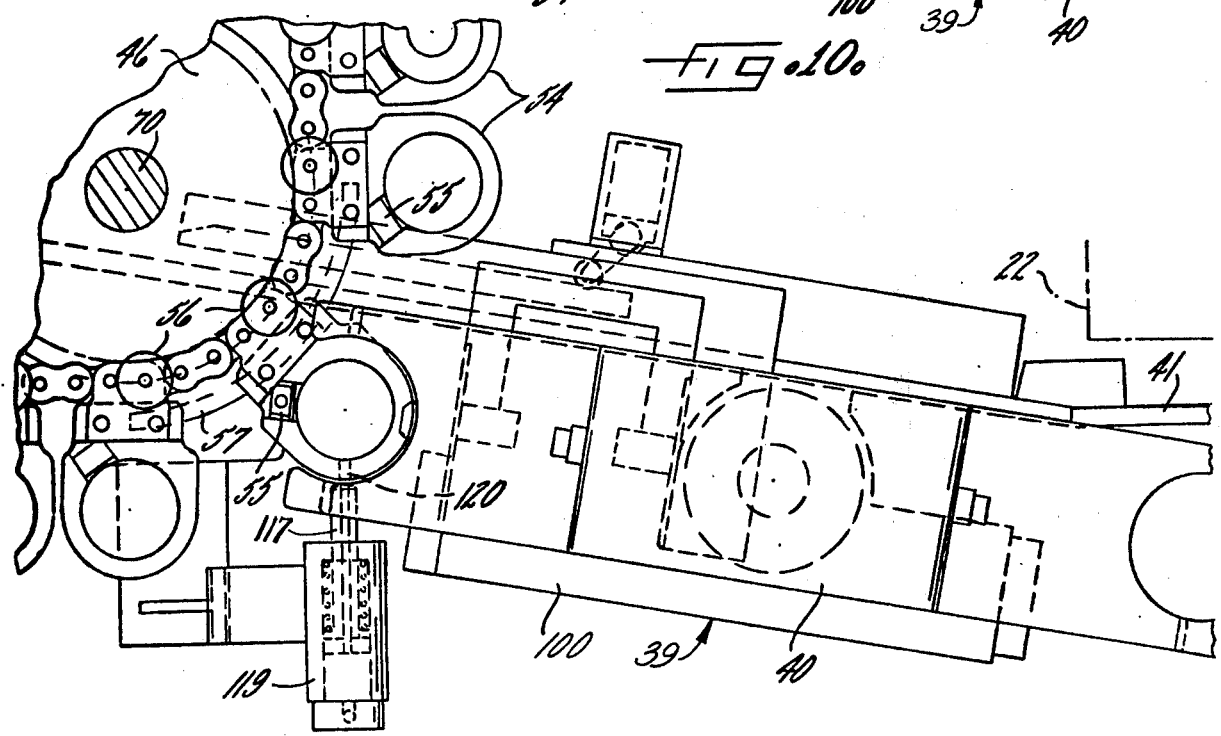

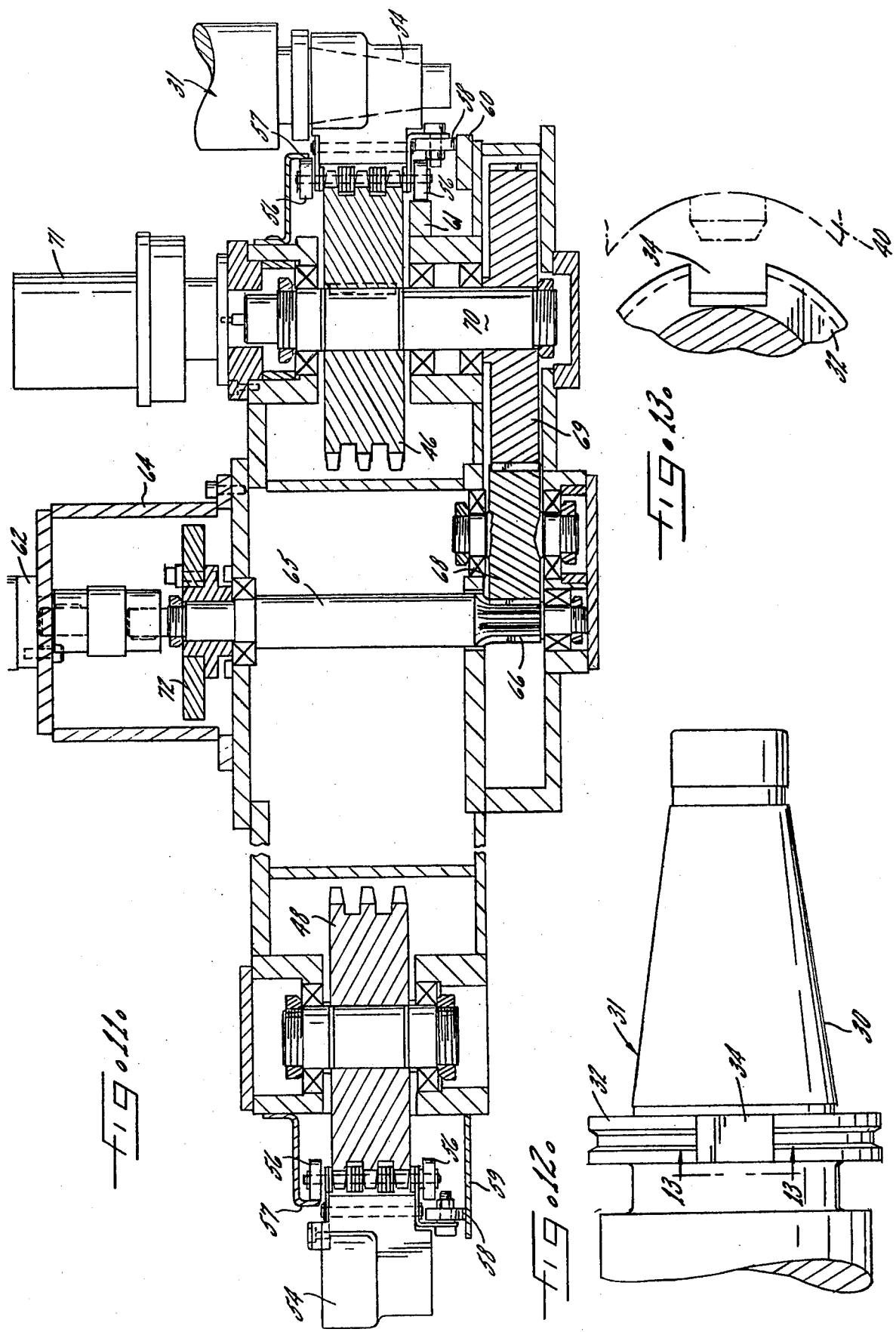

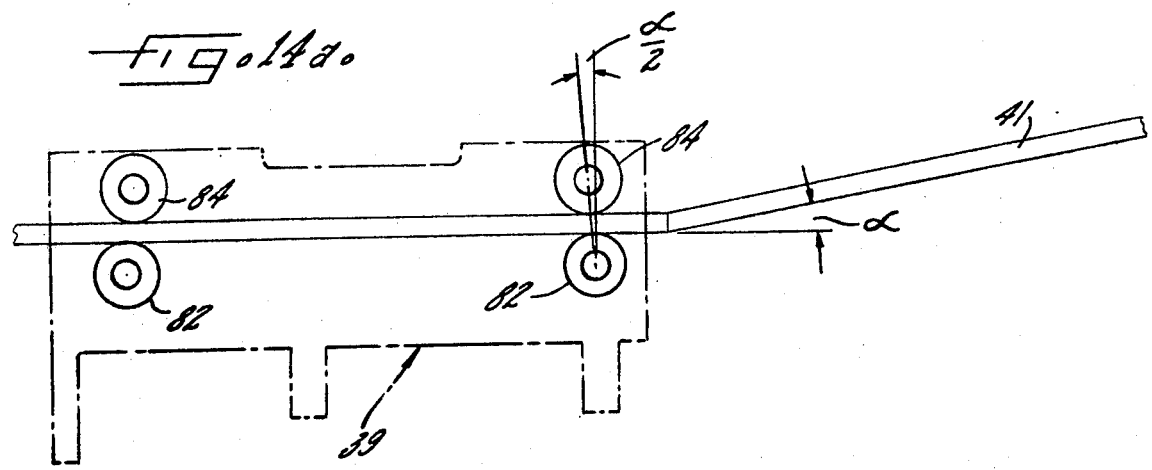
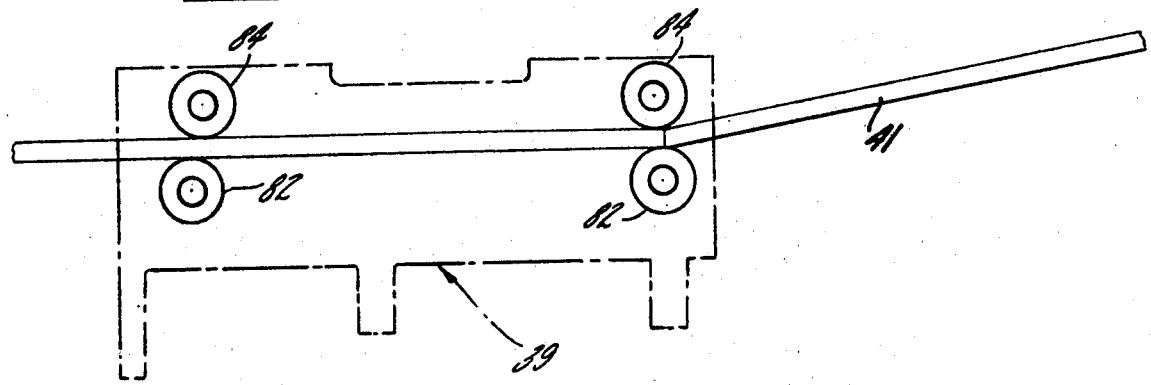
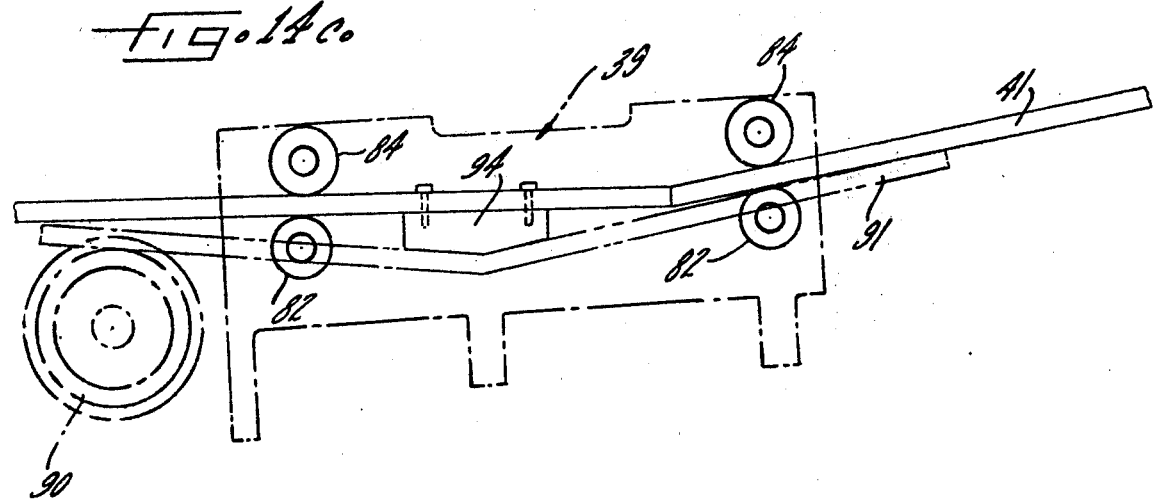

TOOL CHANGER ATTACHMENT FOR MULTI-FUNCTION MACHINE TOOLS

DESCRIPTION OF THE INVENTION

The present invention relates to the field of automated machine tools and, more specifically, to an automatic tool changer which finds particular, but not exclusive, utility in relatively large multi-function machine tools known as machining centers.

During the past several years, machine tools with automatic tool changing capability have come into widespread commercial use. Those currently available vary greatly in size, tool storage capacity, and configuration. They also suffer from a number of disadvantages, including an undesirable transfer of weight, usually from the tool storage magazine, to the other components of the machine; interference with the normal movements of the machine components; and undue complexity resulting in excessive tool change time which tends to limit the effectiveness of the machine. A further disadvantage is the limited tool storage capacity of the magazine, dictated by compromises intended to offset one or more of the foregoing disadvantages.

It is, accordingly, an object of the present invention to provide an automatic tool changer in the form of a relatively simple, self-contained mechanism adapted for installation on a horizontal spindle machining center as original equipment or as an accessory.

Another object is to provide an automatic tool changer of the character set forth above which may be incorporated into a horizontal spindle, multi-function machine tool without interfering with the normal machining motions of the major components of the machine.

A further object is to provide an automatic tool changer of the foregoing type constructed and arranged as a unit with independent ground support, thereby avoiding the transfer of substantial external loads to the conventional machine components.

Still another object of the invention is to provide an automatic tool changer of the foregoing character utilizing an independently supported magazine adapted to carry tools with their axes in a vertical orientation, thereby retaining the tools in their respective sockets through the action of gravity and avoiding substantial overhanging loads on the magazine.

A further object of the invention is to provide an automatic tool changer of the above type having a novel means for air cleaning each empty tool socket of the magazine as an incident to entry into the tool transfer station to receive a previously used tool.

Other objects and advantages will become apparent from the description which follows, taken in light of the accompanying drawings, wherein:

FIG. 1 is a perspective view of an illustrative table type boring, drilling, milling and tapping machine including a tool changer unit exemplifying the present invention.

FIG. 2 is an enlarged elevational view illustrating the shuttle and transfer arm mechanism interposed between the tool storage magazine and the machine spindle.

FIG. 3 is a plan view of the shuttle and transfer arm mechanism, taken in the plane of the line 3—3 in FIG. 2.

FIG. 4 is a vertical sectional view through the shuttle and transfer arm mechanism taken in the plane of the line 4—4 in FIG. 2.

FIG. 5 is an enlarged fragmentary elevational view illustrating the shuttle and transfer arm mechanisms in further detail.

FIG. 6 is a plan view of the extension arm mechanism with the arm in the lowered position shown in FIG. 4.

FIG. 7 is a vertical sectional view through the transfer arm support means, taken in the plane of the line 7—7 in FIG. 6.

FIG. 9 is a plan view of the tool storage magazine and its connection with the shuttle track at the tool transfer station.

FIG. 11 is a further enlarged fragmentary vertical sectional view taken in the plane of the line 11—11 in FIG. 9.

FIG. 12 is an enlarged fragmentary elevational view illustrating the shank portion of a toolholder of the type utilized in the tool changer embodying the present invention.

FIG. 13 is a fragmentary transverse sectional view through a portion of the toolholder shown in FIG. 12, taken in the plane of the line 13—13.

Figure 10:
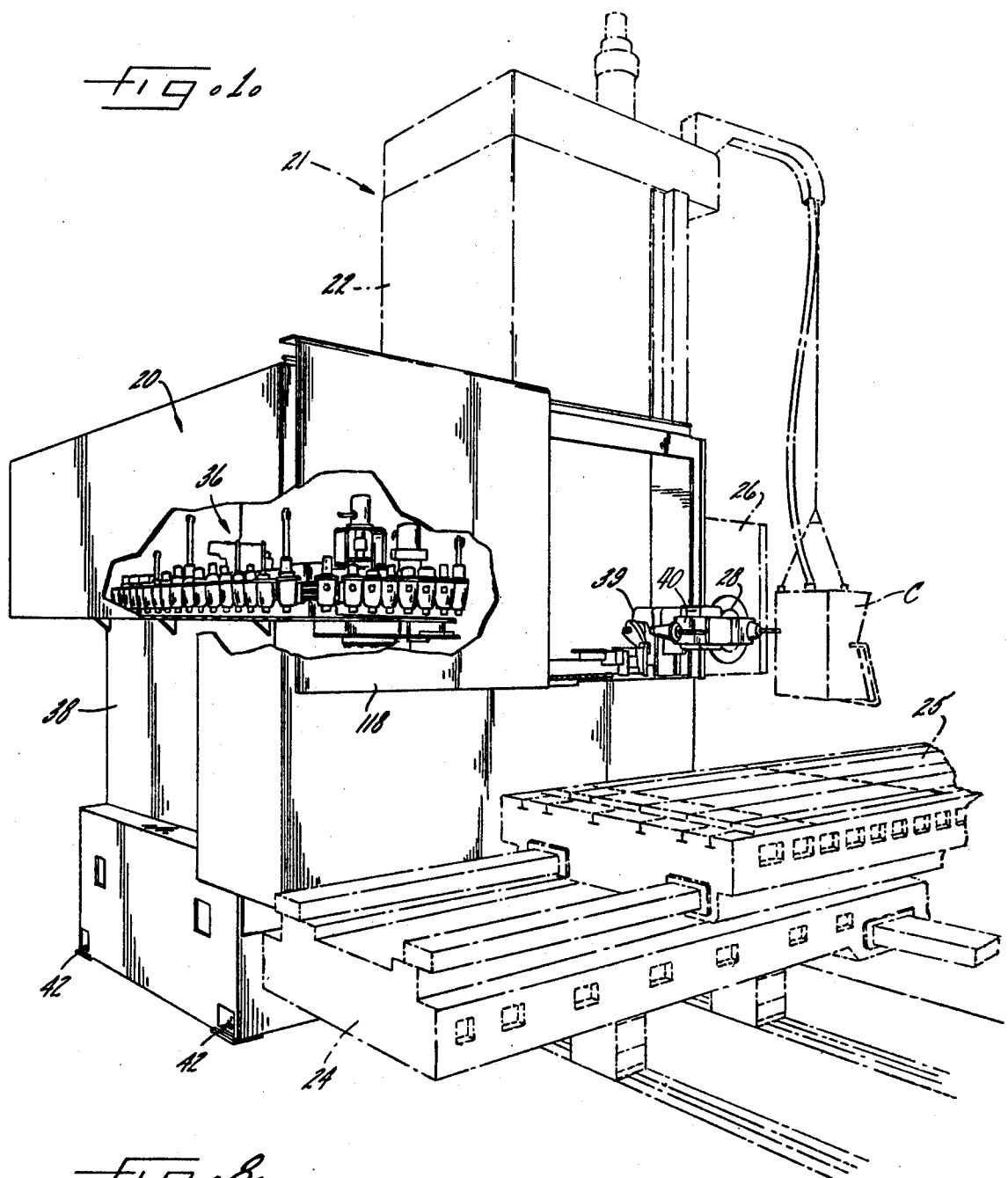
FIG. 10 is a further enlarged fragmentary plan view showing the engagement between a tool at the transfer station in the magazine and the shuttle mounted transfer arm.
Figure 8:
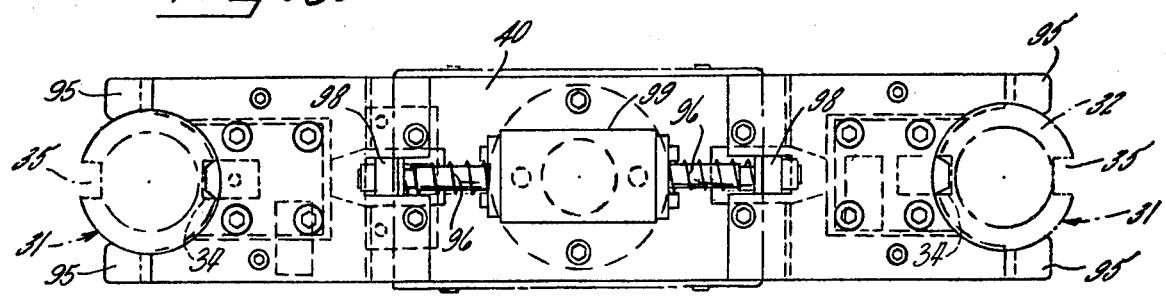
FIG. 8 is a front elevational view of the transfer arm per se, illustrating the tool gripping mechanism.

FIGS. 14a, 14b, and 14c are diagrammatic sequential views illustrating the manner in which the shuttle passes the angular transition in the track.

While the invention is susceptible of various modifications and slternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

Referring more specifically to FIGS. 1-3, the invention is there exemplified in an illustrative automatic tool changer 20 operatively associated with a horizontal spindle machining center 21 of the table type. The machine is adapted to perform boring, drilling, milling, tapping and automatic tool changing operations, all under numerical control.

The machining center 21 in this case comprises a heavy upstanding column 22, a saddle 24 translatably mounted on ways in front of the column, and a table 25 translatably mounted on ways situated on top of the saddle extending transversely of the saddle ways. A headstock 26, with a power driven spindle 28 projecting from its front face, is mounted on ways for vertical sliding movement on the right hand side of the column (as viewed in FIG. 1). The operator's station, as indicated by the control pendant C, is to the right of the headstock (as viewed in FIG. 1). The spindle 28 is formed with a tapered socket 29 for receiving the correspondingly tapered shank 30 of a toolholder 31 (FIGS. 12, 13). The latter is formed with a gripping flange 32 for handling by the tool changer and a pair of diametrically opposed keyways 34, 35 adapted to register with the drive keys on the spindle. In this instance, the keyway 34 is shallower than the opposite keyway 35 in order to maintain the angular orientation of the toolholder as it is inserted into, and withdrawn from, the spindle socket.

The automatic tool changer 20 comprises, in general, a tool storage magazine 36 located in spaced relation with the machine 21 on an independent ground supported base 38, a reciprocating shuttle 39 carrying a two handed rotary exchange arm 40, and a shuttle track 41 extending between the magazine 36 and the headstock 26. The track 41 is fixed to the magazine base 38 and to the front face of the column 22. The shuttle 39 is adapted to effect pivotal and extensible movements of the pivot support for the exchange arm 40 so as to orient the arm properly with respect to the magazine 36 or the spindle 28.

The tool storage magazine 36 (FIGS. 1, 2, 9-11) comprises base 38 which, in this embodiment, is independent of the machine 21 and mounted separately on the foundation through leveling devices 42. This locates the magazine on the side of the column remote from the operator's station represented by the control pendant C. The base 38 is a rigid, box-like structure of rectilinear shape having an opposed pair of sides which are shorter horizontally than the other pair. The top of the base is extended beyond the two shorter sides, defining panel overhangs 44, 45. Four heavy chain sprockets 46, 48, 49, 50 are journaled on these areas, two per overhang. An endless triple course roller chain 51 is trained around all four sprockets 46-50 for movement in a horizontal plane about the top of the base 38. The chain 51 is maintained under predetermined tension by adjustment 52 associated with the sprocket 50 (FIG. 9).

The operator's station, as indicated by the control pendant C, is to the right of the headstock (as viewed in FIG. 1). The chain 51 carries at longitudinally spaced intervals a series of pots 54 each having an open-ended vertical socket adapted to receive the tapered shank 30 of a toolholder 31 with the gripping flange 32 of the latter resting on top of the pot. To maintain angular orientation of the toolholders, each pot has a locating key 55 adapted to engage the deeper keyway 35 in the toolholder flange (FIG. 10). Each pot 54 is supported by a pair of lateral guide rollers 56 engaging lateral support bars 57, 61 and a vertical guide roller 58 which engages suitable horizontal support bars 59, 60 (FIG. 11).

The magazine chain 51 and pots 54 are driven by suitable means such as hydraulic motor 62 (FIGS. 2, 9, 11) mounted on a bracket 64 fixed to the top of the base. The motor 62 is connected to a drive shaft 65 which transmits power to drive sprocket 46 via pinion 66, idler 68, and gear 69 having a splined connection with sprocket shaft 70. The position of each pot in the magazine is signaled to the machine control by resolver 71 coupled to the upper end of sprocket shaft 70.

Provision is made for precisely positioning each pot 54 in the tool transfer station of the magazine (FIGS. 9, 10) for insertion or extraction of a toolholder. This is accomplished in the present instance by utilizing a disc type cam 72 fixed on the motor drive shaft 65 and by forming a semicircular notch 74 in its periphery. A roller 75 journaled in rocker arm 76 follows the periphery of the cam under pressure from fluid actuator 78. When the selected pot reaches the tool transfer station, the roller 75 drops into the notch 74 and locks the drive. Pressurizing the actuator in the opposite direction retracts the roller 75 and arm 76, permitting free movement of the magazine. The foregoing parts are so proportioned that one revolution of the motor 62 will move the magazine chain a distance equal to the center to center distance of two adjacent pots.

Turning next to the reciprocating shuttle 39 (FIGS. 2-5), it will be noted that the latter in this case has a generally rectangular configuration with a channel shaped cross section straddling the track 41. The shuttle is equipped with two pairs of top and bottom vertical guide rollers 80, 81 which ride on the top and bottom edges of the track. It also has four pairs of lateral guide rollers 82, 84 which ride along the side faces of the track adjacent its upper and lower edges. The shuttle is driven longitudinally of the track in either direction by means such as hydraulic motor 85 mounted on one end of the shuttle (FIGS. 2 and 3). The motor 85 is supplied with pressure fluid from manifold 86 depending from the bottom of the shuttle via lines 88, 89. The manifold, in turn, is supplied by flexible conduit 87 from a source (not shown) at the machine. A drive sprocket 90 directly attached to the drive shaft of motor 85 engages a chain type rack 91 secured longitudinally of the track 41 to reciprocate the shuttle.

One end of the track 41 is anchored on the magazine base 38 near the transfer station as by bolts 92 and suitable spacers to provide clearance for the shuttle (FIG. 2). The other end of the track is anchored by bolts 92 and spacers to the front face of the column 22 adjacent the headstock 26 (FIG. 4). Because the magazine 36 has been set back from the front faces of the column and headstock to clear the work handling area, the track 41 has in this instance a straight portion adjacent the column and an intermediate portion which makes a somewhat abrupt rearward bend toward the magazine at an angle $\alpha$ of approximately 10 degrees from the straight portion.

Referring to FIGS. 3 and 14a–14c, it will be seen that the shuttle 39 is constructed so as to travel around the 10 degree bend without binding. This is accomplished in the present case by offsetting the center to center axes of each pair of lateral guide rollers 82, 84 by an angle of $\alpha/2$ or 5 degrees so that the fore and aft distance between centers of the front rollers 82 is somewhat greater than that of the rear rollers 84. In addition, due to the overhung end mounting of the shuttle drive motor 85, the chain type rack 91 is held away from the front of the track 41 by a spacer block 94 situated beyond the bend in the track and in a direction toward the overhung drive motor (FIG. 14c). As shown sequentially in diagrammatic FIGS. 14a, 14b, and 14c, this arrangement permits the shuttle to traverse the bend smoothly.

It will be noted that the shuttle 39 does not directly engage a toolholder, either at the magazine or at the spindle. Instead, it utilizes the shiftable tool exchange arm 40 for the purpose. Referring more particularly to FIGS. 4–6, the arm 40 has a pocket at each end thereof for receiving the peripheral portion of the toolholder gripping flange 32. Each pocket has a pair of gripper fingers 95 maintained in a normally engaged condition by biasing springs 96 and wedge members 98. The gripper fingers may be released by admitting pressure fluid to the piston rod ends of the double actuator 99 at the center of the arm 40. This forces pistons 97 toward each other, releasing the wedge members 98 from engagement with their associated gripper fingers 95. The double actuator 99 is protectively housed within a rectangular cover 103 (FIGS. 4–6).

The tool exchange arm 40 is mounted for 180° degree indexing movement on a housing 100, being connected by a shaft 101 to a pinion 102 (FIGS. 6, 7). The latter is driven by means of a rack 104 integral with a hydraulic piston 105 which reciprocates within the housing 100. A transducer 103 coupled to the end of shaft 101 signals the indexed position of the arm 40.

The tool exchange arm 40 is also mounted for axial movement selectively in a horizontal plane parallel to the spindle axis, and in a vertical plane parallel to the axes of the toolholders and pots in the magazine 36. This is accomplished by means of a slide 106 fixed to the arm housing 100 near one end thereof. The slide 106 is telescopically housed in a guideway 108 mounted on the shuttle 39. A hydraulic actuator 109 enclosed within and interposed between the slide and guideway 106, 108 is thus adapted to reciprocate the arm 40 axially. To permit such axial motion to occur in either a vertical plane or a horizontal plane, the guideway 108 is mounted for pivotal movement on the shuttle between a horizontal position, shown in FIG. 4, and a vertical position, shown in FIG. 5.

In order to provide for pivotal movement of the guideway 108, arm 40, housing 100, and slide 106, the shuttle is formed with a pair of upstanding bosses 110 which straddle the guideway 108 leaving a small clearance (FIG. 5). The guideway is rigidly secured to a rock shaft 111 journaled in the bosses 110. A bifurcated crank arm 112 is secured to one end of the rock shaft which projects beyond one of the bosses. The crank arm 112 is connected by pin 116 to the piston rod 114 of a second hydraulic actuator 115. The lower end of the actuator 115 is pivotally secured to the shuttle as by pin 118 (FIGS. 4 and 5). The actuator 115 is thus adapted to pivot the arm 40 bodily between the horizontal and the vertical positions. Limit switches on the shuttle sense these positions.

Pressure fluid for operating the actuators 99, 105, 109, and 115 on the shuttle and transfer arm may conveniently be supplied from the manifold 86 by appropriate flexible hoses (not shown).

In order to facilitate the exchange of tools between the magazine pots 54 and the exchange arm 40, an air valve 119 is mounted adjacent the transfer station of the magazine (FIG. 10). The valve 119 is disposed in position to cooperate with each pot entering the tool transfer station to receive an old tool, and to register with the external port of an air passage 120 therein. When this occurs, the pot is given a blast of air to clear away debris prior to seating the old tool. The pot moves clear of the valve 119 as it leaves the transfer station.

Turning now to the operation of the tool changer 20, it will be assumed that the tool exchange arm and shuttle are in parked position at the magazine (FIG. 9); that a machining cycle with the old tool in the spindle has just ended; and that the control has called for a tool change. The following sequence occurs: (1) The protective sliding door 118 moves to the left as shown in FIG. 1; the spindle orients to tool change position; and the spindle moves axially to an extension of 4 inches. (2) Simultaneously with (19 above, the arm 40 clamps on a new tool (actually a toolholder) at the tool transfer station; the arm 40 moves vertically 5.25 inches to clear the new toolholder shank from the tool pot; the shuttle and arm 40 move to the right to the open door position; the arm 40 drops vertically 5.25 inches; and the arm with the new tool swings downwardly 90 degrees to put the new tool in horizontal position parallel to the spindle axis. (3) The shuttle and tool exchange arm 40 move to the right against a positive stop on the track 41, and the gripper of arm 40 clamps onto the old tool (actually a toolholder) in the spindle. (49 The spindle releases the power drawbolt from the old tool and the arm 40 moves horizontaly 5.25 inches to withdraw the tool shank from the spindle. (5) The tool exchange arm 40 rotates 180 degrees. (6) The arm 40 moves back 5.25 inches to insert the new tool in the spindle; the power drawbolt then engages the new tool; and the arm gripper is released from the new tool. (7) The tool exchange arm with the old tool moves to the left of the spindle to an intermediate parked position at the open door; the arm 40 swings up 90 degrees to vertical position; and the sliding door 118 closes. (8) The spindle, saddle and table shift to new positions and the machining cycle begins with the new tool. (9) Tool exchange arm 40 and shuttle move toward transfer station as magazine indexes to bring up pot for old tool. (10) Tool exchange arm raises 5.25 inches with old tool to clear pot; air blast from valve 119 enters pot through port 120 (FIG. 10) and clears away any debris; tool exchange arm moves down 5.25 inches to place old tool in pot. (11) Tool exchange arm gripper unclamps from old tool in magazine pot and moves to the right clear of the tools in the magazine. (12) Magazine indexes to next position and tool exchange arm 40 moves to the left to positive stop on shuttle track; arm is engaged on, but not clamped, to next tool.

We claim as our invention:

1. An automatic tool changer attachment for a horizontal spindle multi-function machine tool including a column, a headstock and a spindle in said headstock, said attachment comprising, in combination:
    (a) a tool storage magazine having a plurality of toolholder pots;
    (b) an independent base spaced apart from said machine tool in general alinement with the column but offset to the rear of the headstock face and on the side of the column remote from the operator's station;
    (c) a shuttle track interposed between said magazine and said headstock;
    (d) a shuttle mounted for reciprocating movement along said track;
    (e) a two handed rotary tool exchange arm mounted on said shuttle;
    (f) means for rotating said tool exchange arm;
    (g) means on said tool exchange arm for gripping toolholders;
    (h) means for axially moving said tool exchange arm normal to the plane of said arm selectively in a horizontal direction parallel to the spindle axis adapting said arm to exchange tools with said spindle, and in a vertical direction parallel to the axes of said magazine pots adapting said arm to exchange tools with said magazine.

2. An automatic tool changer attachment as defined in claim 1, wherein said shuttle comprises means which includes a first hydraulic actuator for moving said tool exchange arm axially in a direction normal to its plane and a second hydraulic actuator for swinging said first actuator through 90 degrees.

3. An automatic tool changer attachment for horizontal spindle machining centers adapted to perform boring, drilling, milling and tapping operations and comprising, in combination:
    (a) a tool storage magazine;
    (b) a shuttle track interposed between said magazine and the headstock of said machining center and having an angular bend therein;

(c) a shuttle mounted for reciprocation along said track;

(d) a drive sprocket on said shuttle;

(e) a chain type rack fixed to said shuttle track in meshing engagement with said drive sprocket;

(f) a two handed tool exchange arm mounted on said shuttle;

(g) means for rotating said tool exchange arm;

(h) means on said tool exchange arm for gripping toolholders;

(i) means on said shuttle for effecting axial movement of said exchange arm normal to the plane of said arm;

(j) means for shifting said exchange arm and said axial movement means selectively between a first position where said axial movement is in a horizontal direction enabling said arm to exchange tools with said spindle, and a second position where said axial movement is in a vertical direction enabling said arm to exchange tools with said magazine.

4. An automatic tool changer attachment as defined in claim 3, wherein said shuttle track has an angular bend in its intermediate portion on the order of 10 degrees.

5. An automatic tool changer attachment as defined in claim 3, wherein said shuttle has lateral guide rollers on both sides of the track and a greater fore and aft spacing between those rollers on the outside of the bend than between those on the inside of the bend, wherely said shuttle is adapted to traverse the bend freely.

6. An automatic tool changer attachment as set forth in claim 3, wherein said shuttle is traversed by engagement of its drive sprocket with said chain type rack fixed to said shuttle track, and said chain type rack has an angular bend displaced longitudinally from the angular bend of said shuttle track.

7. An automatic tool changer attachment for a multifunction machine tool having a headstock and a horizontal spindle journaled therein, said attachment comprising, in combination:

(a) a magazine base having a top surface with an overhang at opposite ends thereof, said base being independent structurally of the machine tool;

(b) a plurality of sprockets journaled on the overhang of said top surface for rotation about vertical axes;

(c) an endless chain member trained around said sprockets;

(d) a plurality of toolholder pots fixed to said chain with their axes in a vertical position at longitudinally spaced intervals and indexable therewith through a tool transfer station;

(e) lateral and vertical guide rollers journaled on each said pot;

(f) vertical and horizontal guide bars fixed on said base and disposed for engagement with said lateral and vertical guide rollers, respectively;

(g) a shuttle track interposed between said magazine and the headstock of said machine;

(h) a shuttle reciprocable on said track; and (i) a two handed rotary tool exchange arm mounted on said shuttle, said shuttle having means for axial movement normal to the plane of said arm selectively in a horizontal direction parallel to the spindle axis adapting said arm to exchange tools with said spindle, and in a vertical direction parallel to the axes of the magazine pots adapting said arm to exchange tools with said magazine.

8. The combination set forth in claim 7, wherein an air valve is mounted at the transfer station in position to cooperate with each pot entering the tool transfer station to receive an old tool, and to register with the external port of an air passage therein, whereby said pot is given a blast of air to clear away debris prior to seating the old tool in the pot.

9. An automatic tool changer attachment for a horizontal spindle machining center having a column, a headstock and a horizontal spindle journaled therein, said attachment comprising the combination of:

(a) a tool storage magazine mounted on an independent base spaced from said machining center in general alinement with the column but offset to the rear of the headstock face and on the side of the column remote from the operator's station;

(b) a shuttle track interposed between said magazine and the headstock of said machining center;

(c) said shuttle track having a straight portion adjacent said column and another portion bent rearwardly toward the magazine end at an angle substantially less than 90 degrees from said straight portion;

(d) a shuttle supported by said track for reciprocation longitudinally thereof;

(d) a guideway journaled on said shuttle for pivotal movement between a vertical and a horizontal plane;

(e) a slide mounted within said guideway for telescopic movement axially thereof;

(f) an exchange arm housing fixed to said slide; and (g) a rotary tool exchange arm journaled on said exchange arm housing for movement in a plane normal to the telescopic axis of said slide and guideway.

10. An automatic tool changer attachment as defined in claim 9, wherein a first actuator is interposed between said guideway and said slide for extending and retracting said tool exchange arm axially of said guideway, and a second actuator is interposed between said shuttle and a member integrally connected to said guideway for swinging the latter through an angle of 90 degrees.

* * * * *